(12) United States Patent
Miyake et al.

(10) Patent No.: US 11,492,057 B2
(45) Date of Patent: Nov. 8, 2022

(54) WORKPIECE CONVEYANCE SYSTEM, ON-FLOOR CARRIAGE, UNDER-FLOOR CARRIAGE, AND WORKPIECE CONVEYANCE METHOD

(71) Applicants: TOYOTA JIDOSHA KABUSHIKI KAISHA, Toyota (JP); TSUBAKIMOTO CHAIN CO., Kita-ku (JP)

(72) Inventors: Hirota Miyake, Toyota (JP); Hiromitsu Abe, Toyota (JP); Kunji Morimoto, Toyota (JP); Atsushi Nakagami, Osaka (JP)

(73) Assignees: TOYOTA JIDOSHA KABUSHIKI KAISHA, Toyota (JP); TSUBAKIMOTO CHAIN CO., Kita-ku (JP)

( * ) Notice: Subject to any disclaimer, the term of this patent is extended or adjusted under 35 U.S.C. 154(b) by 0 days.

(21) Appl. No.: 17/329,723

(22) Filed: May 25, 2021

(65) Prior Publication Data

US 2021/0403109 A1 Dec. 30, 2021

(30) Foreign Application Priority Data

Jun. 29, 2020 (JP) .............................. JP2020-111528

(51) Int. Cl.
*B62D 65/02* (2006.01)
*B66F 7/26* (2006.01)
*B23P 19/10* (2006.01)

(52) U.S. Cl.
CPC ............ *B62D 65/022* (2013.01); *B23P 19/10* (2013.01); *B66F 7/26* (2013.01); *B23P 2700/50* (2013.01)

(58) Field of Classification Search
CPC ...... B23P 2700/50; B62D 65/022; B66F 7/26; E04H 6/06; B23Q 7/005; B23Q 7/1442; B23Q 7/1436; B23Q 7/1405; B23Q 7/14
USPC ............................................ 198/339.1, 345.1
See application file for complete search history.

(56) References Cited

U.S. PATENT DOCUMENTS

| 4,734,979 A * | 4/1988 | Sakamoto ............. B23P 21/004 198/468.4 |
| 8,011,491 B2 | 9/2011 | Nakagawa et al. |
| 2009/0250315 A1* | 10/2009 | Nakagawa ............. B62D 65/18 198/586 |

(Continued)

FOREIGN PATENT DOCUMENTS

| JP | 2015-16657 A | 9/2015 |
| JP | 2019-003241 A | 1/2019 |

(Continued)

*Primary Examiner* — Christopher J Besler
(74) *Attorney, Agent, or Firm* — Oblon, McClelland, Maier & Neustadt, L.L.P.

(57) ABSTRACT

The present disclosure provides a workpiece conveyance system that can be configured at a low cost. A first exemplary aspect is a workpiece conveyance system configured to convey a first workpiece inside a facility and raise the first workpiece, the workpiece conveyance system including: an on-floor carriage configured to be movable on a floor of the facility, the on-floor carriage including a placement part on which the first workpiece is placed; and an elevating machine configured to push up the placement part, the elevating machine being configured separately from the on-floor carriage.

6 Claims, 11 Drawing Sheets

(56) References Cited

U.S. PATENT DOCUMENTS

2010/0028113 A1   2/2010   Tohyama et al.

FOREIGN PATENT DOCUMENTS

| RU | 2 175 928 C1 | 11/2001 |
|---|---|---|
| RU | 2 463 193 C | 10/2012 |
| SU | 1759691 A1 | 9/1992 |

\* cited by examiner

WORKPIECE CONVEYANCE SYSTEM, ON-FLOOR CARRIAGE, UNDER-FLOOR CARRIAGE, AND WORKPIECE CONVEYANCE METHOD

CROSS REFERENCE TO RELATED APPLICATIONS

This application is based upon and claims the benefit of priority from Japanese patent application No. 2020-111528, filed on Jun. 29, 2020, the disclosure of which is incorporated herein in its entirety by reference.

BACKGROUND

The present disclosure relates to a workpiece conveyance system, an on-floor carriage, an under-floor carriage, and a workpiece conveyance method.

For example, in a workpiece conveyance system used in a production line of automobiles or the like, self-propelled carriages are used to convey workpieces to be assembled. Such a carriage includes, as disclosed in, for example, Japanese Unexamined Patent Application Publication No. 2019-3241, an elevating machine for raising and lowering workpieces. That is, in a general workpiece conveyance system, all the carriages include elevating machines.

SUMMARY

The applicant has however found the following problem. As described above, all the carriages include elevating machines in a general workpiece conveyance system. This causes a problem that the whole workpiece conveyance system becomes expensive.

The present disclosure has been made in view of the above-described problem and provides a workpiece conveyance system, an on-floor carriage, an under-floor carriage, and a workpiece conveyance method that can configure a workpiece conveyance system at a low cost.

A first exemplary aspect is a workpiece conveyance system configured to convey a first workpiece inside a facility and raise the first workpiece, the workpiece conveyance system including:

an on-floor carriage configured to be movable on a floor of the facility, the on-floor carriage including a placement part on which the first workpiece is placed; and an elevating machine configured to push up the placement part, the elevating machine being configured separately from the on-floor carriage.

By this structure, it is possible to raise (i.e., push up) the first workpiece placed on the placement part of the on-floor carriage by means of the elevating machine, and it is thus possible to eliminate the need for providing the on-floor carriage with the elevating machine. Therefore, it is possible to configure the workpiece conveyance system at a low cost.

The workpiece conveyance system may further include an under-floor carriage disposed under the floor of the facility, the under-floor carriage including the elevating machine, in which movement of the on-floor carriage and movement of the under-floor carriage may be synchronized with each other in a state in which they are stacked on each other in a vertical direction.

By this structure, it is possible to push up the first workpiece while moving the on-floor carriage.

In the workpiece conveyance system described above, the under-floor carriage may be disposed below a conveyance apparatus configured to convey a second workpiece in which the first workpiece is assembled, movement of the under-floor carriage being synchronized with the conveyance of the second workpiece.

By this structure, it is possible to synchronize movement of the on-floor carriage and movement of the under-floor carriage with movement of the second workpiece and assemble the first workpiece in the second workpiece, and it is thus possible to make the conveyance speed of the second workpiece substantially constant.

The workpiece conveyance system described above may include:

a plurality of the on-floor carriages each configured to convey a plurality of the first workpieces individually, the plurality of the first workpieces being assembled in the one second workpiece; and a plurality of the under-floor carriages, in which the on-floor carriages or the under-floor carriages may travel at intervals based on assembly position information of each of the first workpieces that are assembled in the second workpiece.

By this structure, the first workpiece can be disposed at a proper assembly position with respect to the second workpiece.

In the workpiece conveyance system described above, the elevating machine may operate based on the assembly position information of each of the first workpieces that are assembled in the second workpiece.

By this structure, it is possible to push up the first workpiece to a proper assembly position with respect to the second workpiece.

In the workpiece conveyance system described above, the on-floor carriage may include a penetration part through which an extending/contracting part of the elevating machine is passed.

In the workpiece conveyance system described above, the on-floor carriage may include a support part capable of following movement of the placement part in the vertical direction, the support part preventing a deflection of the placement part in a horizontal direction.

Another exemplary aspect is an on-floor carriage configured to move on a floor of a facility and convey a workpiece, the on-floor carriage including:

a placement part on which the workpiece is placed; and a penetration part through which an extending/contracting part of an elevating machine is passed, the elevating machine being configured separately from the on-floor carriage, in which the extending/contracting part pushes up the placement part.

By this structure, it is possible to push up the workpiece placed on the placement part of the on-floor carriage by means of the elevating machine, and it is thus possible to eliminate the need for providing the on-floor carriage with the elevating machine.

Another exemplary aspect is an under-floor carriage configured to move under a floor of a facility in synchronization with movement of an on-floor carriage in a state in which they are stacked on each other in a vertical direction, the on-floor carriage being configured to move on the floor of the facility and convey a workpiece and including a placement part on which the workpiece is placed, the under-floor carriage including an elevating machine configured to push up the placement part.

By this structure, it is possible to push up the workpiece placed on the placement part of the on-floor carriage by means of the elevating machine, and it is thus possible to eliminate the need for providing the on-floor carriage with the elevating machine.

Another exemplary aspect is a workpiece conveyance method including:

moving a carriage in a state in which a workpiece is placed on a placement part of the carriage, thereby conveying the workpiece; and pushing up the placement part by means of an elevating machine configured separately from the carriage, thereby raising the workpiece.

In this way, it is possible to push up the workpiece placed on the placement part of the on-floor carriage by means of the elevating machine, and it is thus possible to eliminate the need for providing the on-floor carriage with the elevating machine.

According to the present disclosure, it is possible to provide a workpiece conveyance system, an on-floor carriage, an under-floor carriage, and a workpiece conveyance method that can configure a workpiece conveyance system at a low cost.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

A specific embodiment to which the present disclosure is applied will be described hereinafter in detail with reference to the drawings. However, the present disclosure is not limited to the embodiment shown below. Further, for the clarification of the explanation, the following descriptions and the drawings are simplified as appropriate.

Figure 1:
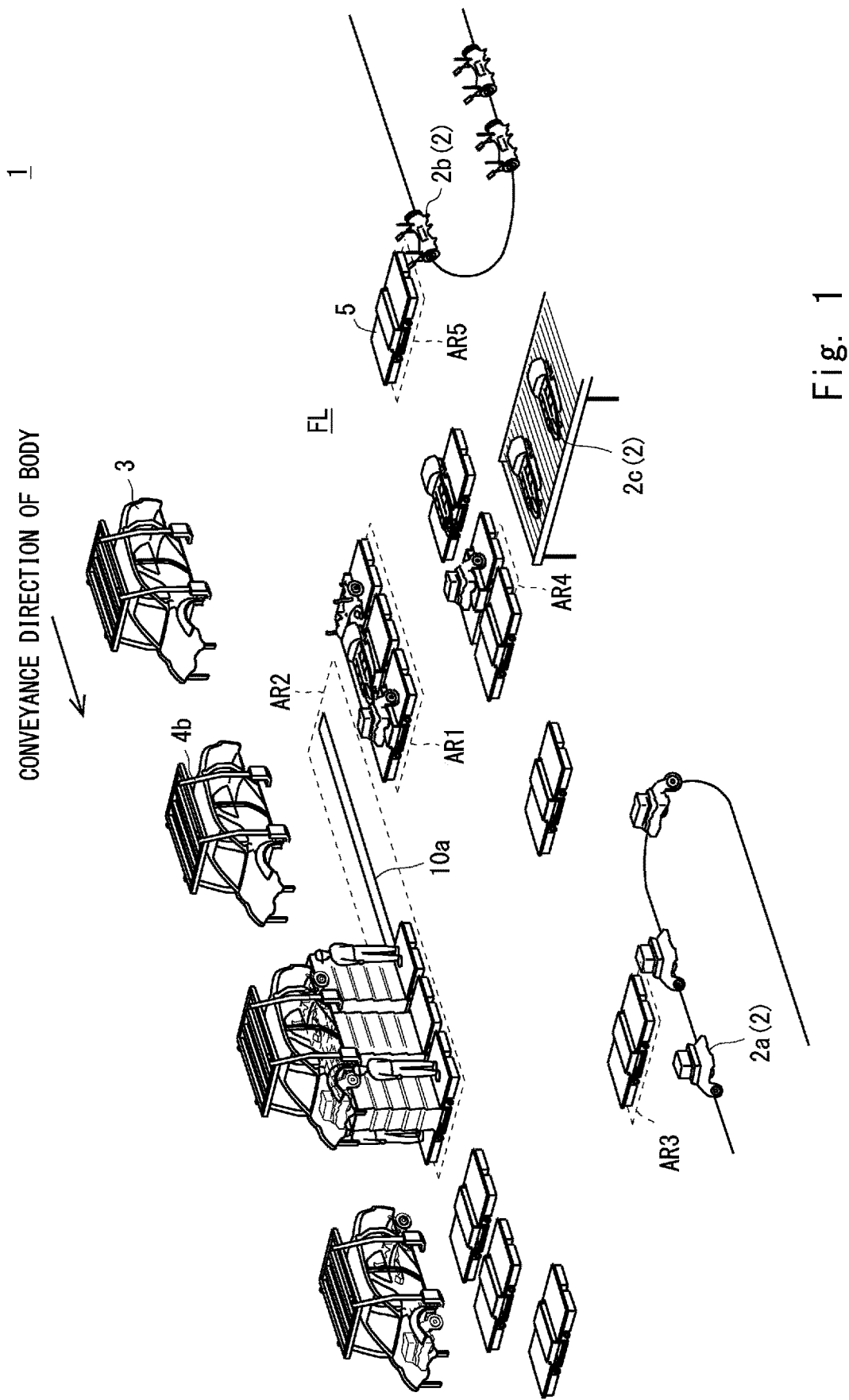
FIG. 1 is a perspective view schematically showing a workpiece conveyance system according to an embodiment.
Figure 2:
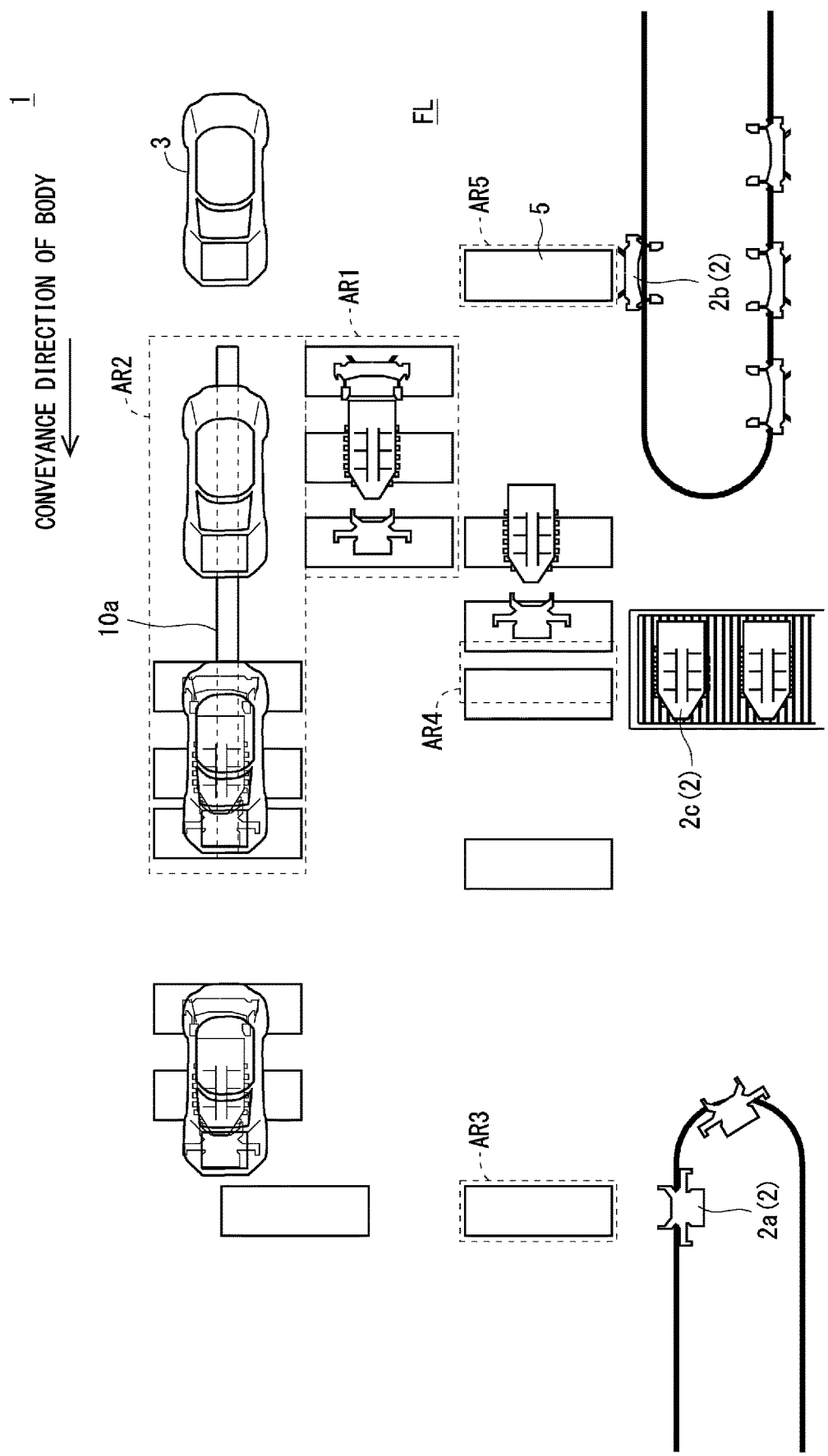
FIG. 2 is a plan view schematically showing the workpiece conveyance system according to the embodiment.
Figure 3:
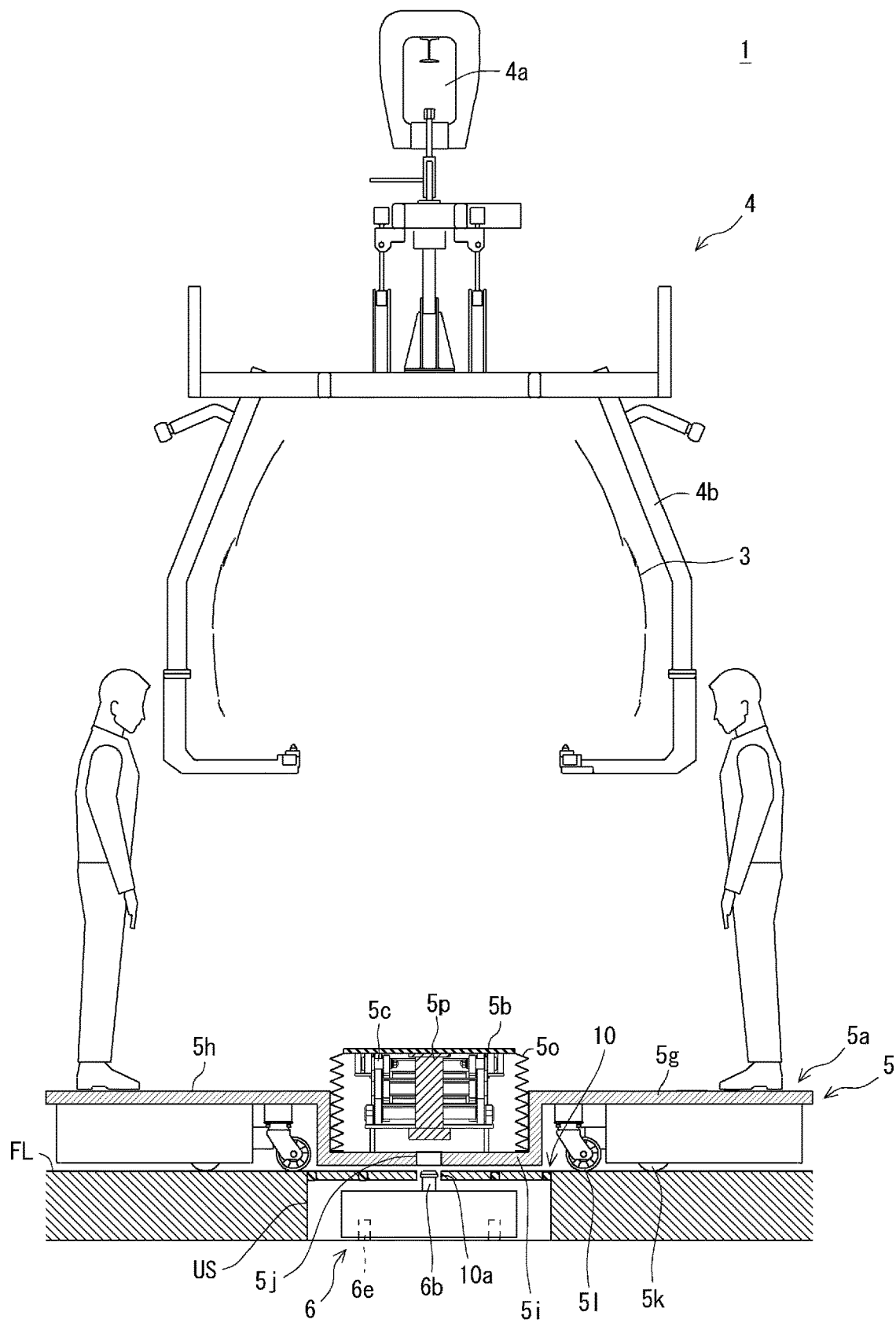
FIG. 3 is a cross-sectional view of an area in which a first workpiece is assembled in a second workpiece in the workpiece conveyance system according to the embodiment as viewed from a front side of the second workpiece.
Figure 4:
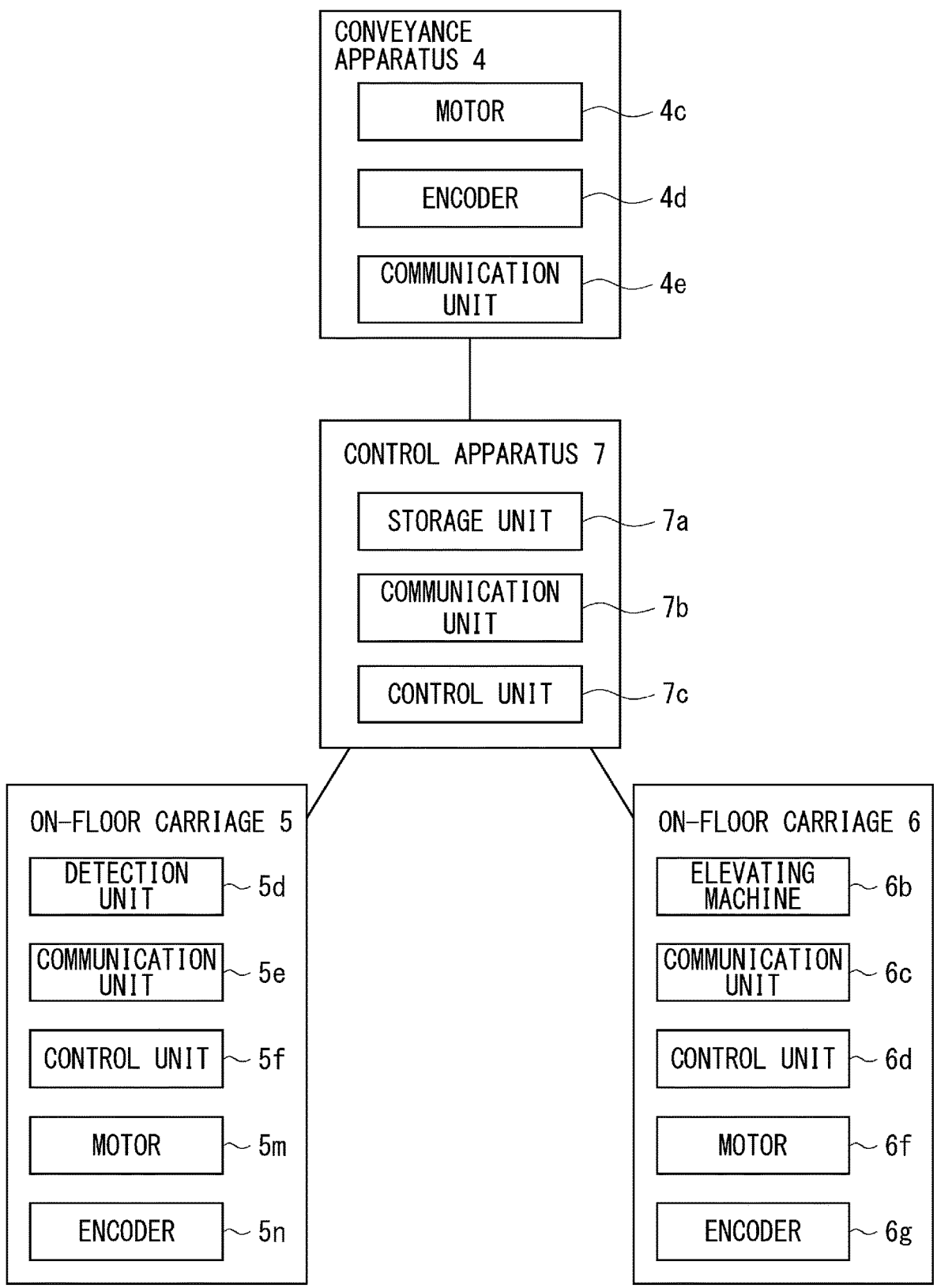
FIG. 4 is a block diagram of a control system of the workpiece conveyance system according to the embodiment.

First, a configuration of a workpiece conveyance system according to this embodiment will be described. FIG. 1 is a perspective view schematically showing the workpiece conveyance system according to this embodiment. FIG. 2 is a plan view schematically showing the workpiece conveyance system according to this embodiment. FIG. 3 is a cross-sectional view of an area in which a first workpiece is assembled in a second workpiece in the workpiece conveyance system according to this embodiment as viewed from a front side of the second workpiece. FIG. 4 is a block diagram of a control system of the workpiece conveyance system according to this embodiment. Note that in FIGS. 1 to 3, members are omitted as appropriate in order to facilitate understanding of the drawings.

A workpiece conveyance system 1 according to this embodiment is suitable, for example, for a facility such as a production line of automobiles, and is used for assembling a first workpiece 2 in a second workpiece 3. Here, the first workpieces 2 are, for example, a front assembly 2a constituting a front suspension and its peripheral members of an electric automobile, a rear assembly 2b constituting a rear suspension and its peripheral members thereof, and a battery 2c disposed between the front assembly 2a and the rear assembly 2b.

Further, the second workpiece 3 is, for example, a body (hereinafter may be denoted by the same reference symbol 3 as that denoting the second workpiece) of an electric automobile. However, the first and the second workpieces 2 and 3 are not limited to the above, and any workpieces that can be fixed to each other may be used as the first and the second workpieces 2 and 3.

As shown in FIGS. 1 to 4, the workpiece conveyance system 1 includes a conveyance apparatus 4, an on-floor carriage 5, an under-floor carriage 6, and a control apparatus 7. As shown in FIG. 3, the conveyance apparatus 4 is configured so that it includes a hanger 4b movable along a rail 4a, and can convey the second workpiece 3 in a state in which the second workpiece 3 is suspended and supported by the hanger 4b. However, the conveyance apparatus 4 may have any configuration in which it can convey the second workpiece 3 above a floor FL of a facility.

At this time, the conveyance apparatus 4 is configured to hold, with the hanger 4b, the second workpieces 3 arranged in advance in the conveyance order and convey them. Further, the conveyance apparatus 4 is configured to detect, by an encoder 4d, a rotational angular velocity of a motor 4c for moving the hanger 4b along the rail 4a and output information indicating the detected rotational angular velocity of the motor 4c to the control apparatus 7 through a communication unit 4e.

As shown in FIGS. 1 and 2, the on-floor carriage 5 moves on the floor FL of the facility to convey the first workpieces 2. At this time, in order to convey the first workpieces 2, the on-floor carriage 5 may travel by itself (i.e., autonomously moves) on the floor FL of the facility. However, the on-floor carriage 5 may instead move along a rail or the like laid on the floor FL of the facility or may instead move based on an instruction from the outside.

In this embodiment, for example, a plurality of sets of on-floor carriages travel by themselves on the floor FL of the facility, each of the sets of on-floor carriages comprising the on-floor carriage 5 that conveys the front assembly 2a, the on-floor carriage 5 that conveys the rear assembly 2b, and the on-floor carriage 5 that conveys the battery 2c. However, the number of on-floor carriage 5 constituting a set of on-floor carriages can be changed as appropriate in accordance with the number of first workpieces 2 to be assembled in the second workpiece 3.

Figure 5:
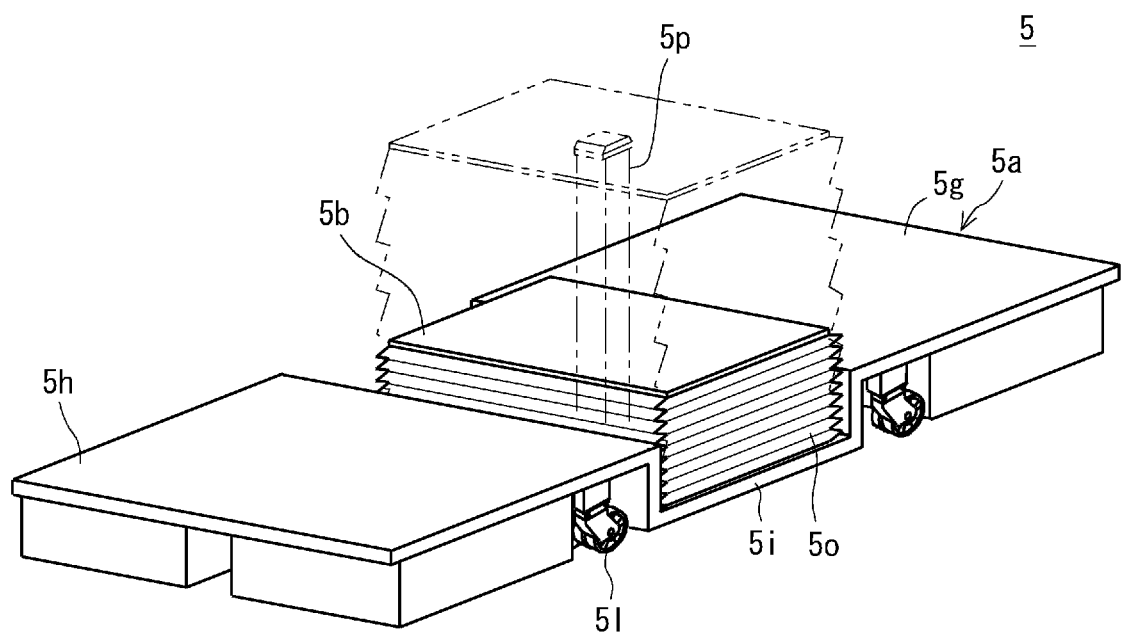
FIG. 5 is a perspective view schematically showing an on-floor carriage according to the embodiment.
Figure 6:
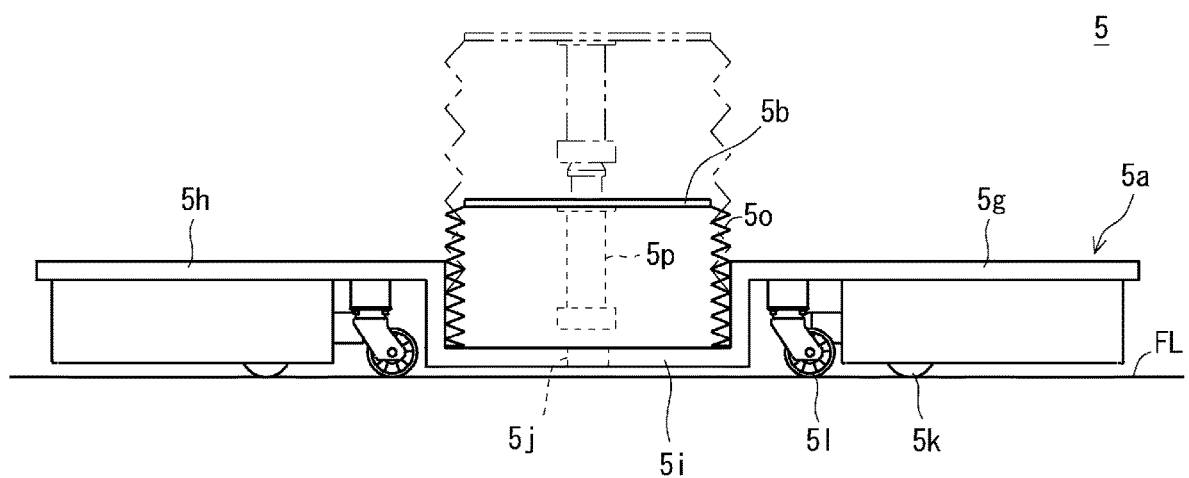
FIG. 6 is a front view schematically showing the on-floor carriage according to the embodiment.

FIG. 5 is a perspective view schematically showing the on-floor carriage according to this embodiment. FIG. 6 is a front view schematically showing the on-floor carriage according to this embodiment. Note that, in FIGS. 5 and 6, a state in which the placement part is pushed up is shown by an alternate long and two short dashes line. Further, in FIGS. 5 and 6, the support part is omitted in order to clearly show the state in which the placement part is pushed up.

For example, as shown in FIGS. 3 to 6, the on-floor carriage 5 includes a base 5a, a placement part 5b, a support part 5c, a detection unit 5d, a communication unit 5e, and a control unit 5f. The base 5a includes a first step 5g, a second step 5h, and a connection part 5i.

An upper surface of the first step 5g is a substantially flat surface, and the first step 5g has, for example, a substantially rectangular shape when the on-floor carriage 5 is viewed from the vertical direction. The second step 5h and the first step 5g are disposed so that they are spaced from each other in the left and right directions of the on-floor carriage 5, respectively. An upper surface of the second step 5h is a substantially flat surface, and the second step 5h has, for example, a substantially rectangular shape when the on-floor carriage 5 is viewed from the vertical direction. The substantially flat surface of the first step 5g and the substantially flat surface of the second step 5h are located at substantially the same height.

The connection part 5i connects the first step 5g to the second step 5h. The connection part 5i has a substantially U-shape when the on-floor carriage 5 is viewed from the front side thereof, and one end of the connection part 5i is fixed to the first step 5g, and the other end of the connection part 5i is fixed to the second step 5h. A penetration part 5j through which an extending/contracting part 6h of an elevating machine 6b described later passes is formed in the connection part 5i.

Driving wheels 5k and trailing wheels 5l are provided on the lower surfaces of the first step 5g and the second step 5h, respectively, of the base 5a described above. Each driving wheel 5k is rotationally driven by a driving force of a motor 5m. At this time, the rotational angular velocity of the motor 5m is detected by an encoder 5n.

The first workpiece 2 is placed on the placement part 5b. For example, an upper surface of the placement part 5b is a substantially flat surface, and the placement part 5b is disposed so that it can move in the vertical direction with respect to the base 5a. The support part 5c can follow movement of the placement part 5b in the vertical direction, and prevents a deflection of the placement part 5b in the horizontal direction.

As shown in FIG. 3, for example, the support part 5c includes a pantograph, which is disposed in a recessed part of the connection part 5i. Further, the lower end part of the support part 5c is fixed to the upper surface of the recessed part of the connection part 5i, and the upper end part of the support part 5c is fixed to the lower surface of the placement part 5b.

It should be noted that the support part 5c may be covered with a cover part 5o. The cover part 5o is a cylindrical body formed so as to have a bellows shape, and the lower end part of the cover part 5o is fixed to the upper surface of the recessed part of the connection part 5i, and the upper end part of the cover part 5o is fixed to the lower surface of the placement part 5b. By this structure, even if an operator drops a bolt or the like onto the base 5a when he/she assembles the first workpiece 2 in the second workpiece 3, it is possible to prevent the bolt or the like from entering the support part 5c.

The detection unit 5d detects movement of the under-floor carriage 6. The detection unit 5d includes, for example, a photoelectric sensor, and is fixed to the on-floor carriage 5 so that the photoelectric sensor can emit a laser beam in a downward direction thereof. The detection unit 5d outputs detection information indicating the detected movement of the under-floor carriage 6 to the control unit 5f. However, the detection unit 5d may have any configuration in which it can detect movement of the under-floor carriage 6.

The communication unit 5e is connected to the control apparatus 7 so that information can be transmitted and received therebetween. The control unit 5f controls the motor 5m so that the on-floor carriage 5 travels by itself on a preset path to convey the first workpiece 2 while referring to detection information of the encoder 5n.

At this time, the control unit 5f controls the motor 5m so that movement of the on-floor carriage 5 is synchronized with movement of the under-floor carriage 6 based on the detection information input from the detection unit 5d, and the control unit 5f controls the motor 5m so that the on-floor carriage 5 waits in a waiting area AR1 (see FIGS. 1 and 2) of the facility for waiting before the first workpiece 2 is assembled in the second workpiece 3, and so that the on-floor carriage 5 enters an assembly working area AR2 (see FIGS. 1 and 2) of the facility for assembling the first workpiece 2 in the second workpiece 3 based on instruction information input from the control apparatus 7. These operations will be described in detail later.

Figure 7:
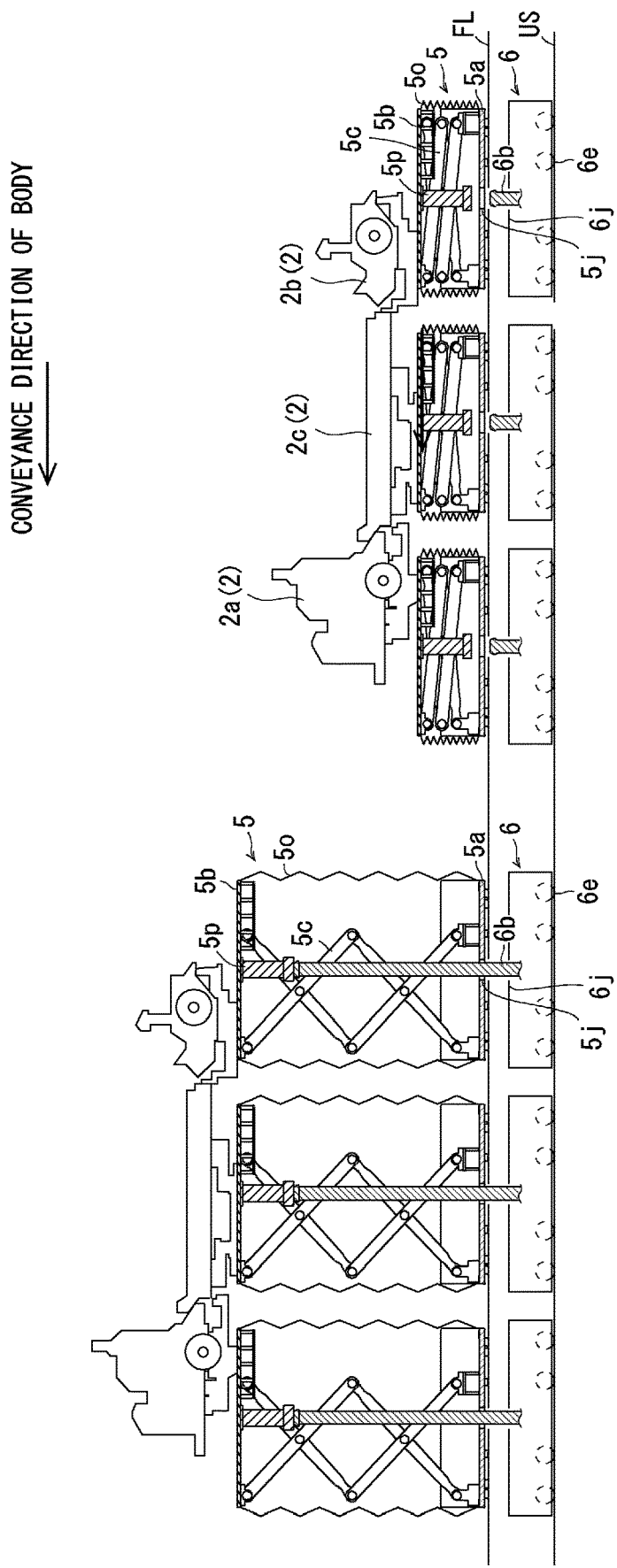
FIG. 7 is a diagram showing a positional relationship between the on-floor carriage and an under-floor carriage according to the embodiment.
Figure 8:
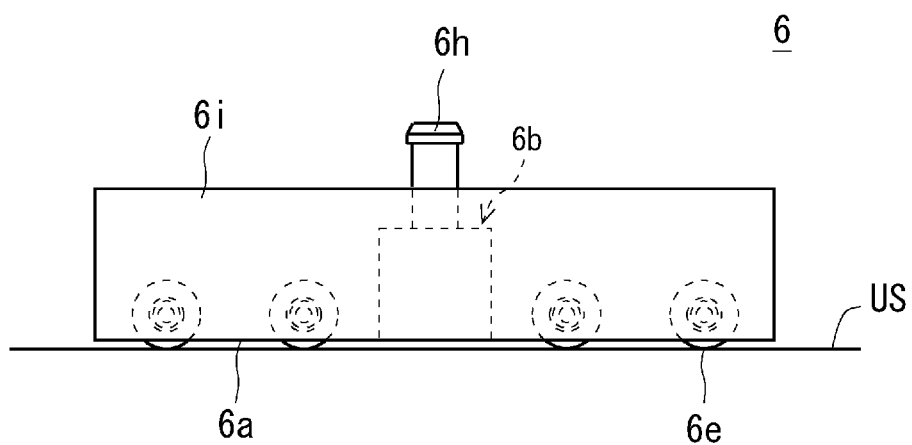
FIG. 8 is a side view schematically showing the under-floor carriage according to the embodiment.
Figure 9:
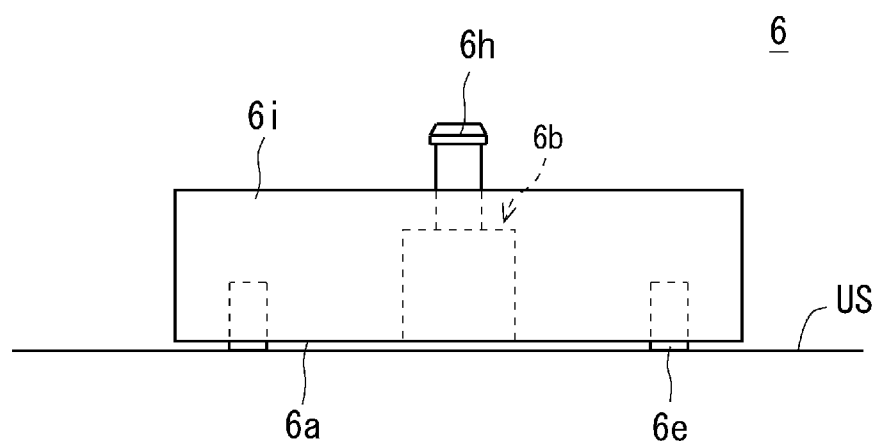
FIG. 9 is a front view schematically showing the under-floor carriage according to the embodiment.
Figure 10:
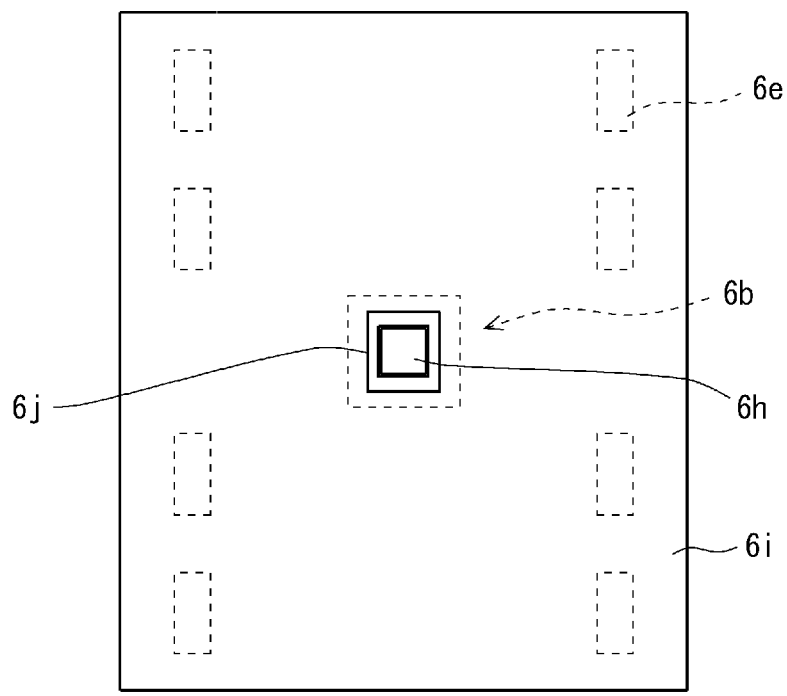
FIG. 10 is a plan view schematically showing the under-floor carriage according to the embodiment.

FIG. 7 is a diagram showing a positional relationship between the on-floor carriage and the under-floor carriage according to this embodiment. FIG. 8 is a side view schematically showing the under-floor carriage according to this embodiment. FIG. 9 is a front view schematically showing the under-floor carriage according to this embodiment. FIG. 10 is a plan view schematically showing the under-floor carriage according to this embodiment. Note that FIG. 7 shows on the right side thereof a state immediately after the on-floor carriages 5 are disposed immediately above the respective under-floor carriages 6, and shows on the left side thereof a state in which the on-floor carriages 5 and the under-floor carriages 6 move in synchronization with each other and the first workpieces 2 are pushed up.

As shown in FIGS. 3 and 7, under the assembly working area AR2 shown in FIGS. 1 and 2, the under-floor carriage 6 travels back and forth in a groove-shaped underfloor space US formed inside the floor FL. The underfloor space US is extended along the rail 4a of the conveyance apparatus 4 and the bottom surface of the underfloor space US is a substantially flat surface.

It should be noted that, in this embodiment, as shown in FIG. 7, the three under-floor carriages 6 are arranged in the direction in which the underfloor space US is extended so that they correspond to the number of on-floor carriages 5 constituting a set of on-floor carriages. However, the number of under-floor carriages 6 can be changed as appropriate so as to correspond to the number of on-floor carriages 5 constituting a set of on-floor carriages.

For example, as shown in FIGS. 8 to 10, the under-floor carriage 6 includes a base 6a, the elevating machine 6b, a communication unit 6c, and a control unit 6d. The base 6a constitutes a chassis of the under-floor carriage 6, and includes driving wheels 6e on the lower surface of the base 6a. Each driving wheel 6e is rotationally driven by a driving force of a motor 6f. At this time, the rotational angular velocity of the motor 6f is detected by an encoder 6g.

The elevating machine 6b is fixed to the upper surface of the base 6a. The elevating machine 6b includes the extending/contracting part 6h that can extend and contract in the vertical direction of the under-floor carriage 6. The extending/contracting part 6h is composed of, for example, a cylinder jack, and has a shape allowing it to be inserted into the penetration part 5j of the on-floor carriage 5. The elevating machine 6b described above is covered with a cover 6i, and as shown in FIG. 10, the extending/contracting part 6h is passed through a penetration part 6j so that it can extend and contract, the penetration part 6j being formed on the upper surface of the cover 6i.

However, the elevating machine 6b may have any structure by which it can push up the placement part 5b of the on-floor carriage 5 in a state in which the first workpiece 2 is placed on the placement part 5b, and can pull down the placement part 5b from which the first workpiece 2 has been removed. Further, the elevating machine 6b may be electric or hydraulic.

It should be noted that, as shown in FIG. 3 and the like, the on-floor carriage 5 may include a transmission part 5p protruding downward from the lower surface of the placement part 5b of the on-floor carriage 5. The transmission part 5p has, for example, a columnar shape, and is disposed so that it and the penetration part 5j overlap each other when viewed from the vertical direction.

By the aforementioned structure, when the extending/contracting part 6h of the elevating machine 6b is extended, it is possible to push up the placement part 5b through the transmission part 5p. Therefore, as compared with a case in which the transmission part 5p is not provided, it is possible to reduce the amount of extension of the elevating machine 6b when the placement part 5b is pushed up to a predetermined height, and accordingly it is possible to reduce the size of the elevating machine 6b.

The communication unit 6c is connected to the control apparatus 7 so that information can be transmitted and received therebetween. The control unit 6d controls the motor 6f so that the under-floor carriage 6 travels back and forth in the underfloor space US based on instruction information input from the control apparatus 7 while referring to detection information of the encoder 6g. This operation will be described in detail later. Further, the control unit 6d controls the elevating machine 6b so that the extending/contracting part 6h extends and contracts based on the instruction information input from the control apparatus 7.

As shown in FIG. 4, the control apparatus 7 includes a storage unit 7a, a communication unit 7b, and a control unit 7c. The storage unit 7a stores, for example, identification information (e.g., information indicating the type of vehicle) of the second workpieces 3 sequentially conveyed by the conveyance apparatus 4, identification information of the first workpiece 2 assembled in the second workpiece 3, assembly position information of the first workpiece 2 with respect to the second workpiece 3.

The communication unit 7b is connected to the communication unit 4e of the conveyance apparatus 4, the communication unit 5e of the on-floor carriage 5, and the communication unit 6c of the under-floor carriage 6 so that information can be transmitted and received therebetween. The communication unit 7b of the control apparatus 7 may be connected, for example, through a network, to the communication unit 4e of the conveyance apparatus 4, the communication unit 5e of the on-floor carriage 5, and the communication unit 6c of the under-floor carriage 6 that are mentioned above.

The control unit 7c generates instruction information for controlling the under-floor carriage 6 so that the under-floor carriage 6 moves in synchronization with movement of the second workpiece 3 based on a result of the detection by the encoder 4d input from the conveyance apparatus 4, and generates instruction information for controlling the on-floor carriage 5 so that the on-floor carriage 5 waits in the waiting area AR1, and so that it enters the assembly working area AR2.

Further, the control unit 7c generates, for example, instruction information for controlling the intervals between the under-floor carriages 6, the amount of extension of the extending/contracting part 6h of the elevating machine 6b, and the like based on identification information of the second workpieces 3 sequentially conveyed by the conveyance apparatus 4, identification information of the first workpiece 2 assembled in the second workpiece 3, and assembly position information of the first workpiece 2 with respect to the second workpiece 3. The above instruction information is transmitted to the on-floor carriage 5 or the under-floor carriage 6 through the communication unit 7b.

Next, a procedure of assembling the front assembly 2a, the rear assembly 2b, and the battery 2c in a body 3 by using the workpiece conveyance system 1 according to this embodiment will be described. First, for example, the control unit 5f of each of the three on-floor carriages 5 constituting a set of on-floor carriages controls the motor 5m so that the on-floor carriage 5 travels by itself on a preset path in the order of a delivery area AR3 of the front assembly 2a, a delivery area AR4 of the battery 2c, and a delivery area AR5 of the rear assembly 2b.

Next, when the front assembly 2a, the battery 2c, and the rear assembly 2b are placed on the placement part 5b of each of the on-floor carriages 5 in an order starting from the leading on-floor carriage 5, the control unit 5f of each of the on-floor carriages 5 controls the motor 5m so that the on-floor carriage 5 travels by itself to the waiting area AR1 and waits there.

At this time, in the waiting area AR1, the on-floor carriage 5 that conveys the rear assembly 2b, the on-floor carriage 5 that conveys the battery 2c, and the on-floor carriages 5 that conveys the front assembly 2a are each made to travel by itself so that they are arranged in this order toward the conveyance direction of the body 3.

When the on-floor carriage 5 reaches the waiting area AR1, the control unit 5f of the on-floor carriage 5 transmits information indicating that the on-floor carriage 5 has reached the waiting area AR1 to the control apparatus 7 through the communication unit 5e of the on-floor carriage 5. When the communication unit 7b of the control apparatus 7 receives the information indicating that the on-floor carriage 5 has reached the waiting area AR1, the control unit 7c of the control apparatus 7 checks whether or not the under-floor carriage 6 is disposed in a starting area of the under-floor space US located opposite to the conveyance direction of the body 3 based on detection information of the encoder 6g of the under-floor carriage 6.

Then the control unit 7c of the control apparatus 7 checks whether or not the next body 3 that reaches the assembly working area AR2 has come close to a position set in advance for the assembly working area AR2 based on detection information of the encoder 4d transmitted from the conveyance apparatus 4.

When the under-floor carriage 6 is disposed in the starting area of the underfloor space US located opposite to the conveyance direction of the body 3, and the body 3 has come close to the position set in advance for the assembly working area AR2, the control unit 7c of the control apparatus 7 generates instruction information for controlling each of the on-floor carriages 5 so that it resumes traveling by itself to a position substantially immediately above the under-floor carriage 6 in the assembly working area AR2, and transmits the generated instruction information to each of the on-floor carriages 5 through the communication unit 7b.

At this time, the three under-floor carriages 6 are disposed in the underfloor space US at desired intervals based on identification information of the body 3 that reaches the assembly working area AR2, identification information of each of the front assembly 2a, the rear assembly 2b, and the battery 2c that are assembled in the body 3, and assembly position information of each of the front assembly 2a, the rear assembly 2b, and the battery 2c with respect to the body 3.

Meanwhile, when the under-floor carriage 6 is not disposed in the starting area of the underfloor space US located opposite to the conveyance direction of the body 3, or the body 3 has not come close to the position set in advance for the assembly working area AR2, the control unit 7c of the control apparatus 7 waits to generate instruction information for controlling each of the on-floor carriages 5 so that it resumes traveling by itself to the position substantially immediately above the under-floor carriage 6 in the assembly working area AR2.

When the communication unit 5e of the on-floor carriage 5 receives the instruction information, the control unit 5f of the on-floor carriage 5 controls the motor 5m so that the on-floor carriage 5 resumes traveling by itself to the position substantially immediately above the under-floor carriage 6 in the assembly working area AR2. At this time, the on-floor carriage 5 enters the assembling working area AR2 from the side of the underfloor space US opposite to the conveyance direction of the body 3 so that the on-floor carriage 5 straddles the underfloor space US with the first and the second steps 5g and 5h thereof, and as shown in the right side of FIG. 7, the under-floor carriages 6 are disposed substantially immediately below the respective on-floor carriages 5.

Next, the control unit 7c of the control apparatus 7 checks whether or not the body 3 has reached substantially immediately above the three under-floor carriages 6 based on detection information of the encoder 4d of the conveyance apparatus 4. When the body 3 reaches substantially immediately above the three under-floor carriages 6, the control unit 7c of the control apparatus 7 generates instruction information for controlling each of the under-floor carriages 6 so that its movement is synchronized with movement of the body 3, and transmits the generated instruction information to each of the under-floor carriages 6 through the communication unit 7b.

On the other hand, when the body 3 has not reached substantially immediately above the three under-floor carriages 6, the control unit 7c of the control apparatus 7 waits to generate instruction information for controlling each of the under-floor carriages 6 so that its movement is synchronized with movement of the body 3.

When the communication unit 6c of the under-floor carriage 6 receives the instruction information, the control unit 6d of the under-floor carriage 6 controls the motor 6f so that movement of the under-floor carriage 6 is synchronized with movement of the body 3. At this time, when the speed at which the conveyance apparatus 4 conveys the body 3 is constant, it is possible to easily move the under-floor carriage 6 so that its movement is synchronized with the movement of the body 3. On the other hand, when the speed at which the conveyance apparatus 4 conveys the body 3 is variable, the control unit 7c of the control apparatus 7 may generate instruction information for the under-floor carriage 6 so that movement of the under-floor carriage 6 is synchronized with movement of the body 3 based on detection information of the encoder 4d of the conveyance apparatus 4.

When the under-floor carriage 6 starts moving so that its movement is synchronized with movement of the body 3, the detection unit 5d of the on-floor carriage 5 detects movement of the under-floor carriage 6 immediately below this on-floor carriage 5, and the control unit 5f of the on-floor carriage 5 controls the motor 5m so that the on-floor carriage 5 moves in synchronization with movement of the under-floor carriage 6 disposed immediately below this on-floor carriage 5 based on the detection information of the detection unit 5d.

At this time, movement of the on-floor carriage 5 and movement of the under-floor carriage 6 are synchronized with each other so that the penetration part 5j of the on-floor carriage 5 and the extending/contracting part 6h of the under-floor carriage 6 substantially overlap each other when viewed from the vertical direction. Then, as shown in FIG. 3, an operator gets on the first step 5g or the second step 5h of the on-floor carriage 5 and moves together with the front assembly 2a, the rear assembly 2b, the battery 2c, and the body 3.

At the same time, the control unit 6d of the under-floor carriage 6 controls the elevating machine 6b so that the extending/contracting part 6h thereof is extended. When the extending/contracting part 6h of the elevating machine 6b is extended, as shown in the left side of FIG. 7, the extending/contracting part 6h passes through the penetration part 5j of the on-floor carriage 5, and the upper end part of the extending/contracting part 6h comes into contact with the placement part 5b of the on-floor carriage 5 through the transmission part 5p, whereby the placement part 5b is pushed up. At this time, as the placement part 5b is supported by the support part 5c, it is possible to prevent a deflection of the placement part 5b.

It should be noted that respective height positions required to assemble the front assembly 2a, the rear assembly 2b, and the battery 2c in the body 3 are different from each other. Therefore, the control unit 7c of the control apparatus 7 calculates the amount of extension required for the extending/contracting part 6h of the elevating machine 6b of each of the under-floor carriages 6 based on identification information of the body 3 that reaches the assembly working area AR2, identification information of each of the front assembly 2a, the rear assembly 2b, and the battery 2c that are assembled in the body 3, and assembly position information of each of the front assembly 2a, the rear assembly 2b, and the battery 2c with respect to the body 3. Then the control unit 7c of the control apparatus 7 generates instruction information for controlling the elevating machine 6b so that the extending/contracting part 6h is extended by the calculated amount of extension, and transmits the generated instruction information to each of the under-floor carriages 6 through the communication unit 7b.

When the communication unit 6c of the under-floor carriage 6 receives the instruction information for extending the extending/contracting part 6h, the control unit 6d of the under-floor carriage 6 controls the elevating machine 6b so that the extending/contracting part 6h is extended by a desired amount of extension based on this instruction information.

By the above structure, it is possible to satisfactorily push up the front assembly 2a, the rear assembly 2b, and the battery 2c by the extending/contracting part 6h of each of the under-floor carriages 6 to a height position where they can be assembled in the body 3. Then, as shown in FIG. 1, an operator assembles the front assembly 2a, the rear assembly 2b, and the battery 2c, which have been pushed up, in the body 3.

As described above, in this embodiment, the elevating machine 6b of the under-floor carriage 6 pushes up the front assembly 2a, the rear assembly 2b, or the battery 2c placed on the placement part 5b of the on-floor carriage 5, and it is thus possible to eliminate the need for providing the on-floor carriage 5 with the elevating machine. Therefore, it is possible to configure the workpiece conveyance system 1 at a low cost.

The control unit 6d of the under-floor carriage 6 controls the elevating machine 6b so that the extending/contracting part 6h contracts when a preset period of time has elapsed after the under-floor carriage 6 starts moving. It should be noted that the preset period of time may be set to a period of time that at least allows an operator to assemble the front assembly 2a, the rear assembly 2b, and the battery 2c in the body 3.

Next, the control unit 6d of the under-floor carriage 6 checks whether or not the under-floor carriage 6 has moved a preset distance in the underfloor space US while referring to the encoder 6g. When the under-floor carriage 6 has moved the preset distance in the underfloor space US, the control unit 6d of the under-floor carriage 6 controls the motor 6f so that the under-floor carriage 6 stops.

On the other hand, when the under-floor carriage 6 has not moved the preset distance in the underfloor space US, the control unit 6d of the under-floor carriage 6 continues controlling the motor 6f so that the under-floor carriage 6 moves the preset distance in the underfloor space US while referring to the encoder 6g.

It should be noted that the preset distance may be set, for example, to a distance which the under-floor carriage 6 travels during a period of time obtained by adding a period of time required until the contraction of the extending/contracting part 6h of the elevating machine 6b is completed to a period of time that at least allows an operator to assemble the front assembly 2a, the rear assembly 2b, and the battery 2c in the body 3.

Therefore, in other words, the underfloor space US is extended so that it has a length which the under-floor carriage 6 travels during a period of time obtained by adding a period of time required until the contraction of the extending/contracting part 6h of the elevating machine 6b is completed to a period of time that at least allows an operator to assemble the front assembly 2a, the rear assembly 2b, and the battery 2c in the body 3.

Further, when the under-floor carriage 6 has moved the preset distance in the underfloor space US, the control unit 6d of the under-floor carriage 6 transmits information indicating that the under-floor carriage 6 has stopped to the control apparatus 7 through the communication unit 6c.

When the communication unit 7b of the control apparatus 7 receives the information indicating that the under-floor carriage 6 has stopped, the control unit 7c of the control apparatus 7 checks identification information of the next body 3 that reaches the assembly working area AR2, identification information of each of the front assembly 2a, the rear assembly 2b, and the battery 2c that are assembled in the body 3, and assembly position information of each of the front assembly 2a, the rear assembly 2b, and the battery 2c with respect to the body 3 based on identification information of the bodies 3 sequentially conveyed by the conveyance apparatus 4, identification information of each of the front assembly 2a, the rear assembly 2b, and the battery 2c that are assembled in the body 3, and assembly position information of each of the front assembly 2a, the rear assembly 2b, and the battery 2c with respect to the body 3.

The control unit 7c of the control apparatus 7 calculates optimum intervals among the three under-floor carriages 6 for assembling the front assembly 2a, the rear assembly 2b, and the battery 2c in the body 3 based on identification information of the next body 3 that reaches the assembly working area AR2, identification information of each of the front assembly 2a, the rear assembly 2b, and the battery 2c that are assembled in the body 3, and assembly position information of each of the front assembly 2a, the rear assembly 2b, and the battery 2c with respect to this body 3. Then the control unit 7c of the control apparatus 7 generates instruction information for controlling each of the three under-floor carriages 6 so that they are disposed in the starting area of the underfloor space US at the calculated intervals.

The control unit 7c of the control apparatus 7 transmits, to each of the three under-floor carriages 6, the instruction information for controlling each of the three under-floor carriages 6 so that they are disposed in the starting area of the underfloor space US at desired intervals through the communication unit 7b.

When the communication unit 6c of each of the three under-floor carriage 6 receives the instruction information for controlling each of the three under-floor carriages 6 so that they are disposed in the starting area of the underfloor space US at desired intervals, the control unit 6d of each of the three under-floor carriages 6 controls the motor 6f while referring to the encoder 6g so that the three under-floor carriages 6 return to the starting area of the underfloor space US while leaving desired intervals among them.

By this structure, the three under-floor carriages 6 can be disposed in the starting area of the underfloor space US at desired intervals in advance based on, for example, assembly position information of each of the front assembly 2a, the rear assembly 2b, and the battery 2c with respect to the next body 3 to be conveyed. Therefore, even when the combination of the body 3 and the front assembly 2a, the rear assembly 2b, and the battery 2c varies due to the conveyance order, the front assembly 2a, the rear assembly 2b, and the battery 2c can be properly disposed at respective assembly positions with respect to the body 3.

Meanwhile, the control unit 5f of the on-floor carriage 5 checks whether or not the on-floor carriage 5 has moved the above-described preset distance after it starts synchronization of the movement of the on-floor carriage 5 with the movement of the under-floor carriage 6 while referring to detection information of the encoder 5n. When the on-floor carriage 5 has moved the preset distance, the control unit 5f of the on-floor carriage 5 controls the motor 5m so that the synchronization between the movement of the on-floor carriage 5 and the movement of the under-floor carriage 6 disposed immediately below the on-floor carriage 5 is released and the on-floor carriage 5 travels by itself on a preset path to receive the new front assembly 2a, the new rear assembly 2b, and the new battery 2c.

On the other hand, when the on-floor carriage 5 has not moved the preset distance, the control unit 5f of the on-floor carriage 5 controls the motor 5*m* while referring to detection information of the detection unit 5*d* so that the synchronization between the movement of the on-floor carriage 5 and the movement of the under-floor carriage 6 disposed immediately below the on-floor carriage 5 continues.

As described above, in the workpiece conveyance system 1, the on-floor carriage 5, the under-floor carriage 6, and the workpiece conveyance method according to this embodiment, the elevating machine 6*b* of the under-floor carriage 6 pushes up the front assembly 2*a*, the rear assembly 2*b*, or the battery 2*c* placed on the placement part 5*b* of the on-floor carriage 5, and it is thus possible to eliminate the need for providing the on-floor carriage 5 with the elevating machine. Therefore, it is possible to configure the workpiece conveyance system 1 at a low cost. In particular, since the on-floor carriage 5 has a simple structure in which the penetration part 5*j* through which the extending/contracting part 6*h* of the elevating machine 6*b* of the under-floor carriage 6 passes is provided, it is possible to configure the workpiece conveyance system 1 at a low cost.

Moreover, in the workpiece conveyance system 1, the on-floor carriage 5, the under-floor carriage 6, and the workpiece conveyance method according to this embodiment, it is possible to synchronize the movement of the on-floor carriage 5 and the movement of the under-floor carriage 6 with the movement of the body 3 and assemble the front assembly 2*a*, the rear assembly 2*b*, and the battery 2*c* in the body 3, and it is thus possible to make the conveyance speed of the body 3 substantially constant. Therefore, it is possible to improve the productivity of a cell automobile.

Further, in the workpiece conveyance system 1, the on-floor carriage 5, the under-floor carriage 6, and the workpiece conveyance method according to this embodiment, the three under-floor carriages 6 can be disposed in the starting area of the underfloor space US at desired intervals in advance based on the assembly position information of the front assembly 2*a*, the rear assembly 2*b*, and the battery 2*c* with respect to the next body 3 to be conveyed. Therefore, even when the combination of the body 3 and the front assembly 2*a*, the rear assembly 2*b*, and the battery 2*c* varies due to the conveyance order, the front assembly 2*a*, the rear assembly 2*b*, and the battery 2*c* can be properly disposed at respective assembly positions with respect to the body 3.

It should be noted that, as shown in FIG. 3, an opening of the underfloor space US may be covered with a lid 10. At this time, the lid 10 may include a penetration part 10*a* through which the extending/contracting part 6*h* of the elevating machine 6*b* of the under-floor carriage 6 passes, the penetration part 10*a* being formed along the rail 4*a* of the conveyance apparatus 4. By this structure, even if a bolt or the like accidentally falls on the floor FL when an operator assembles the front assembly 2*a* or the like in the body 3, it is possible to prevent the bolt or the like from falling to the underfloor space US.

Figure 11:
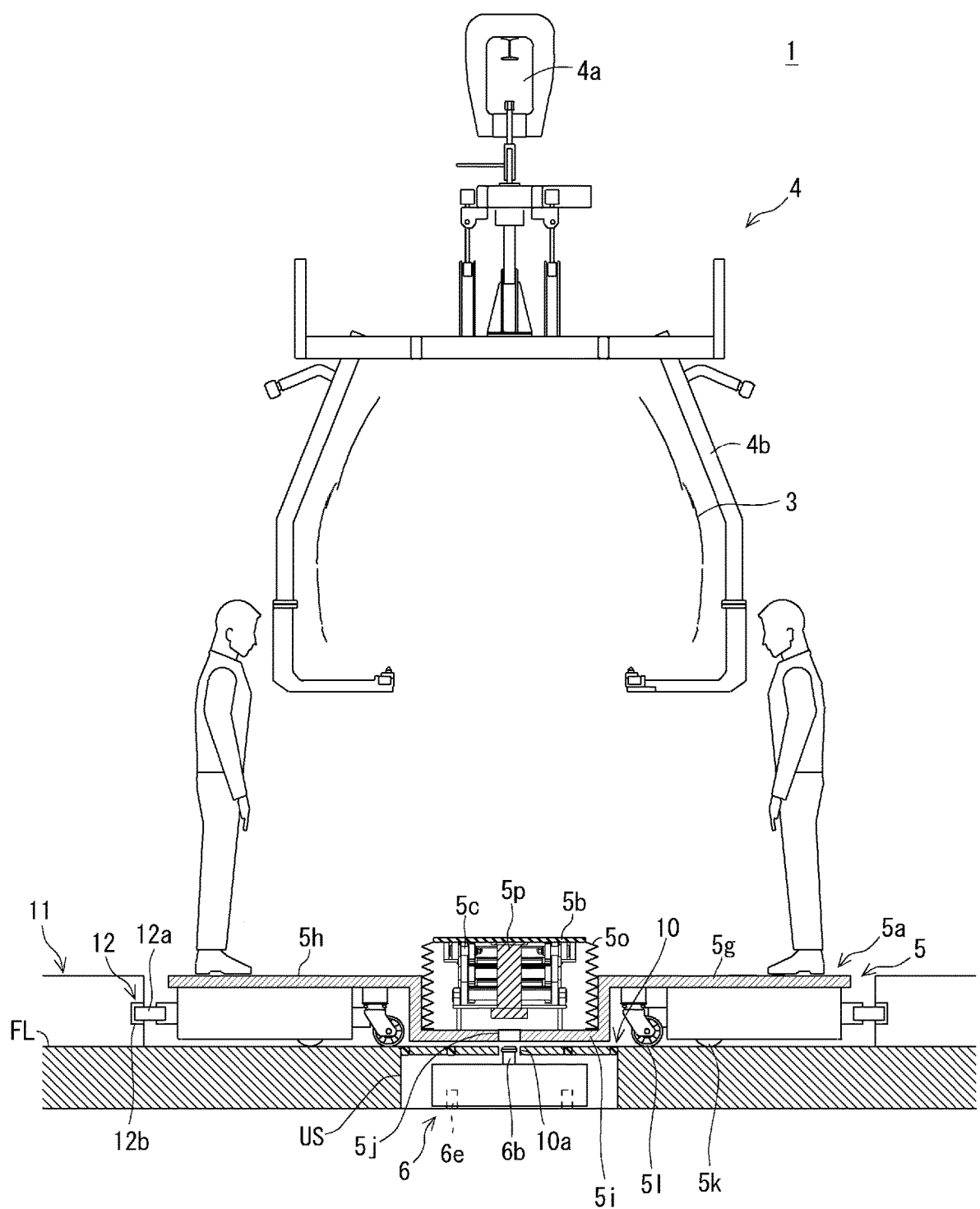
FIG. 11 is a cross-sectional view of an area in which a first workpiece is assembled in a second workpiece in a workpiece conveyance system according to another embodiment as viewed from a front side of the second workpiece.

Further, as shown in FIG. 11, the workpiece conveyance system 1 may include stages 11 on the floor FL along both sides of the underfloor space US. At this time, upper surfaces of the stages 11 may be substantially flat surfaces having a height substantially equal to the height of each of the first and the second steps 5*g* and 5*h* of the on-floor carriage 5. By this structure, it is possible to prevent an operator from tripping when he/she gets on the first step 5*g* or the second step 5*h* of the on-floor carriage 5.

It should be noted that, for example, when a spring of the suspension is fixed to the body 3, the placement part 5*b* of the on-floor carriage 5 is strongly pushed up in order to contract the spring. At this time, in some cases, the on-floor carriage 5 is uplifted from the floor FL when the placement part 5*b* is connected to the base 5*a*. Therefore, the workpiece conveyance system 1 may include a pressing part 12 that prevents the uplift of the on-floor carriage 5.

The pressing part 12 may include, for example, a roller 12*a* which is disposed so that it protrudes outward from the on-floor carriage 5 and which is rotated around a rotation axis extending in the vertical direction, and a groove part 12*b* which is formed on the stage 11 and into which a part of the roller 12*a* is inserted. By this structure, the roller 12*a* is rotated in accordance with the self-traveling of the on-floor carriage 5, and when the on-floor carriage 5 is uplifted, the roller 12*a* comes into contact with the groove part 12*b* and thus the uplift of the on-floor carriage 5 can be prevented. However, the pressing part 12 may have any structure in which it is possible to prevent the uplift of the on-floor carriage 5 when the on-floor carriage 5 travels by itself on the underfloor space US.

The present disclosure is not limited to the above-described embodiment and may be modified as appropriate without departing from the spirit of the present disclosure.

For example, in the above embodiment, although the first workpiece 2 is placed on the placement part 5*b* of each of the on-floor carriages 5, the first workpiece 2 may not be placed on the placement part 5*b* of each of the on-floor carriages 5 in accordance with the second workpiece 3 that is conveyed.

For example, in the above embodiment, although the workpiece conveyance system 1 is applied to a production line of electric automobiles, a facility to which the workpiece conveyance system 1 is applied is not limited, and it is also possible to apply the workpiece conveyance system 1 to a facility for assembling the first workpiece 2 in the second workpiece 3 by pushing up the first workpiece 2.

For example, in the above embodiment, position information of the second workpiece 3 (i.e., the hanger 4*b*), position information of the on-floor carriage 5, and position information of the under-floor carriage 6 are acquired based on detection information of the encoder. However, position information of the hanger 4*b*, position information of the on-floor carriage 5, and position information of the under-floor carriage 6 may be acquired based on position information of a Global Positioning System (GPS) or the like. Further, position information of the hanger 4*b*, position information of the on-floor carriage 5, and position information of the under-floor carriage 6 may be detected by a detection sensor disposed in the facility.

For example, in the above embodiment, the movement of the on-floor carriage 5 is synchronized with the movement of the under-floor carriage 6 by using the detection unit 5*d* of the on-floor carriage 5. However, the on-floor carriage 5 and the under-floor carriage 6 may be connected to each other by the connection part at the time when the movement of the on-floor carriage 5 is synchronized with the movement of the under-floor carriage 6, and by using the driving force of one of the on-floor carriage 5 and the under-floor carriage 6, the other one of them may be moved.

For example, in the above embodiment, the under-floor carriage 6 includes one elevating machine 6*b*, but it may instead include a plurality of elevating machines 6*b*.

For example, in the above embodiment, the elevating machine 6*b* is mounted on the under-floor carriage 6, but may instead be disposed in the facility. In this case, when the first workpiece 2 is assembled in the second workpiece 3, the movement of the second workpiece 3 may be temporarily stopped.

The operations of the on-floor carriage 5 and the under-floor carriage 6 in the above embodiment are merely examples, and it is sufficient that the on-floor carriage 5 and the under-floor carriage 6 be operated so that the first workpiece 2 can be assembled in the second workpiece 3.

For example, the control unit 5f of the on-floor carriage 5, the control unit 6d of the under-floor carriage 6, and the control unit 7c of the control apparatus 7 may be configured of computers, and the respective computers may cause Central Processing Units (CPUs) thereof to execute computer programs to control the conveyance apparatus 4, the on-floor carriage 5, and the under-floor carriage 6.

The program(s) can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program(s) may be provided to a computer using any type of transitory computer readable media. Examples of transitory computer readable media include electric signals, optical signals, and electromagnetic waves. Transitory computer readable media can provide the program(s) to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A workpiece conveyance system configured to convey a plurality of first workpieces inside a facility and raise the plurality of first workpieces, the workpiece conveyance system comprising:
    a plurality of on-floor carriages configured to be movable on a floor of the facility, each of the plurality of on-floor carriages includes a support device having a support surface which is configured to allow placement of one of the plurality of first workpieces;
    one or more elevating machines configured to push up the support surface, each elevating machine being a separate element from the on-floor carriage; and
    a plurality of under-floor carriages each configured to be disposed under the floor of the facility, each under-floor carriage respectively comprises one of the elevating machines,
    wherein the on-floor carriages or the under-floor carriages are configured to travel at intervals based on assembly position information of each of the plurality of first workpieces that are configured to be assembled in a second workpiece,
    wherein the plurality of the on-floor carriages are each configured to individually convey the plurality of the first workpieces, the plurality of the first workpieces being assembled in the second workpiece, and
    wherein each of the plurality of on-floor carriages includes a recessed connection part positioned below a top surface of the on-floor carriages, at least a portion of the support device being positioned within the recessed connection part.

2. The workpiece conveyance system according to claim 1,
    wherein the on-floor carriages and the under-floor carriages are each configured for movement in which the movement of the on-floor carriages and movement of the under-floor carriages are synchronized with each other in a state in which they are stacked on each other in a vertical direction.

3. The workpiece conveyance system according to claim 2, wherein each of the under-floor carriages is disposed below a conveyance apparatus configured to convey the second workpiece in which the plurality of first workpiece are assembled,
    wherein each of the under-floor carriages and the conveyance apparatus are configured such that the movement of the under-floor carriage is synchronized with the conveyance of the second workpiece.

4. The workpiece conveyance system according to claim 1, wherein each of the one or more elevating machines is capable of operation based on the assembly position information of each of the plurality of first workpieces that are assembled in the second workpiece.

5. The workpiece conveyance system according to claim 1, wherein the on-floor carriage comprises an aperture through which an extending/contracting jack of a respective one of the elevating machines is passed.

6. The workpiece conveyance system according to claim 1, wherein the on-floor carriage comprises a support part capable of following movement of the support surface in a vertical direction, the support part preventing a deflection of the support surface in a horizontal direction.

* * * * *